US008665763B2

(12) United States Patent
Choi et al.

(10) Patent No.: US 8,665,763 B2
(45) Date of Patent: Mar. 4, 2014

(54) METHOD FOR CONTROLLING DOWNLINK TRANSMISSION POWER IN WIRELESS COMMUNICATION SYSTEM AND APPARATUS FOR THE SAME

(75) Inventors: Jin Soo Choi, Anyang-si (KR); Jong Min Kim, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 310 days.

(21) Appl. No.: 12/741,345

(22) PCT Filed: Nov. 3, 2008

(86) PCT No.: PCT/KR2008/006464
§ 371 (c)(1),
(2), (4) Date: May 4, 2010

(87) PCT Pub. No.: WO2009/061106
PCT Pub. Date: May 14, 2009

(65) Prior Publication Data
US 2010/0265862 A1    Oct. 21, 2010

Related U.S. Application Data

(60) Provisional application No. 60/985,639, filed on Nov. 5, 2007.

(51) Int. Cl.
*G08C 17/00* (2006.01)
(52) U.S. Cl.
USPC ............ 370/311; 370/310; 370/252; 370/255
(58) Field of Classification Search
USPC .................. 370/252, 329; 455/452.1, 522
See application file for complete search history.

(56) References Cited

U.S. PATENT DOCUMENTS

| 5,530,917 | A | * | 6/1996 | Andersson et al. ............ 455/436 |
|---|---|---|---|---|
| 8,094,733 | B2 | * | 1/2012 | Kwon et al. .................. 375/260 |
| 2001/0011018 | A1 | * | 8/2001 | Baum et al. ................... 455/439 |
| 2004/0179493 | A1 | | 9/2004 | Khan |
| 2005/0277419 | A1 | * | 12/2005 | Takano et al. ................. 455/442 |
| 2007/0149233 | A1 | | 6/2007 | Wang et al. |
| 2008/0081634 | A1 | * | 4/2008 | Kaikkonen et al. ......... 455/452.1 |
| 2008/0084844 | A1 | * | 4/2008 | Reznik et al. ................. 370/330 |
| 2008/0170541 | A1 | * | 7/2008 | Vartiainen et al. ............ 370/328 |
| 2010/0002596 | A1 | * | 1/2010 | Wu ............................... 370/252 |
| 2010/0234058 | A1 | * | 9/2010 | Hu et al. ....................... 455/522 |

FOREIGN PATENT DOCUMENTS

| CN | 1531238 A | 9/2004 |
|---|---|---|
| CN | 1701534 A | 11/2005 |
| CN | 1788430 A | 6/2006 |
| CN | 1859026 A | 11/2006 |
| WO | WO 2004/102828 A1 | 11/2004 |
| WO | WO 2005/020475 A1 | 3/2005 |

* cited by examiner

*Primary Examiner* — Huy D Vu
*Assistant Examiner* — Kuo T Chiang
(74) *Attorney, Agent, or Firm* — Birch, Stewart, Kolasch & Birch, LLP

(57) ABSTRACT

Provided is a method of controlling power of a downlink channel in a wireless communication system, the method including: transmitting at least one data to a user equipment; receiving feedback information for the data from the user equipment; and controlling downlink transmission power using the feedback information. It is possible to control the power without time delay and additional use of radio resources in a VoIP service which is responsible for satisfying a fixed transmission rate in real time. Moreover, it is possible to control the power without waste of control channels to perform PDCCH link adaptation.

8 Claims, 11 Drawing Sheets

METHOD FOR CONTROLLING DOWNLINK TRANSMISSION POWER IN WIRELESS COMMUNICATION SYSTEM AND APPARATUS FOR THE SAME

This application is the National Phase of PCT/KR2008/006464 filed on Nov. 3, 2008, which claims priority under 35 U.S.C. 119(e) to U.S. Provisional Application No. 60/985,639 filed on Nov. 5, 2007, the entire contents is hereby expressly incorporated by reference into the present application.

TECHNICAL FIELD

The present invention relates to wireless communications and, more particularly, to a method of controlling power of a downlink channel in a wireless communication system.

BACKGROUND ART

Next generation multimedia wireless communication system on which extensive research has been carried out is required to process various information, such as images, wireless data, etc., at a higher data transmission rate, beyond the voice-oriented services provided at an early stage.

Thus, orthogonal frequency division multiplexing (OFDM) having a high data transmission rate has recently attracted much attention. The OFDM is a multi-carrier modulation scheme that divides a frequency band into a plurality of orthogonal sub-carriers to transmit data. The OFDM can reduce inter-symbol interference with low complexity. The OFDM converts serially input data symbols into N parallel data symbols, respectively loads the N parallel data symbols on N subcarriers, and transmits the subcarriers having the parallel data symbols loaded thereon. The subcarriers maintain orthogonality in a frequency domain. The respective orthogonal channels experience mutually independent frequency selective fading, and the interval of the transmitted symbols is increased to minimize the inter-symbol interference. Orthogonal frequency division multiple access (hereinafter, referred to as 'OFDMA') is a multiple access scheme which provides a part of available subcarriers to each of users to achieve multiple accesses in an OFDM-based system. In general, the OFDMA provides frequency resources corresponding to subcarriers to each user, in which the respective frequency resources are independently provided to a plurality of users and thus they do not overlap with each other. As a result, the frequency resources are exclusively allocated to the users.

Meanwhile, the wireless communication system employs a power control method to reduce path loss due to the distance between a base station and a user equipment and reduce inter-cell interference by interference between neighboring cells. The power control method is to control the transmission power so as to transmit data at the lowest power level, while maintaining the quality of service (QoS) of the wireless communication system.

The base station schedules radio resources in order to efficiently utilize the limited radio resources. A dynamic scheduling dynamically allocates the radio resources at each predetermined period of frequency or time, in which no radio resources are allocated to a user who has no data packets to transmit and receive and the radio resources are allocated to a user who has data packets to transmit and receive. A persistent scheduling maintains the allocated radio sources for a predetermined period of time. A typical example of the persistent scheduling is a Voice over Internet Protocol (VoIP) service, in which the resources are persistently allocated until a VoIP session is terminated even in the case where no VoIP packets are transmitted to the radio resources allocated to the user. In the case where the persistent scheduling is performed to support multi-channel transmission at a fixed transmission rate in real time, like the VoIP service, it is necessary to control the power so as to reduce time delay and overhead of a control channel.

Moreover, the base station schedules user data with respect to a plurality of user equipments and transmits control information including scheduling information for the user data together with the user data. In general, a channel carrying the control information is referred to as a control channel, and a channel carrying the user data is referred to as a data channel. In order to receive the user data allocated to itself, the user equipment should receive the control information for the user data on the control channel. However, in the case where the control channel uses a fixed modulation and does not receive retransmission, it is necessary to change a code rate with respect to a wide range of input signals semi-statically. Accordingly, it is necessary to control the power for link adaptation so as to be adapted to a change in a wireless channel environment.

DISCLOSURE OF INVENTION

Technical Problem

A method is sought for controlling power, which reduces waste of radio resources. A method is also sought for controlling transmission power for a user equipment that receives persistent scheduling or a user equipment that performs PDCCH link adaptation.

Technical Solution

In one aspect, a method of controlling power of a downlink channel in a wireless communication system is provided. The method includes transmitting at least one data to a user equipment, receiving feedback information for the data from the user equipment, and controlling downlink transmission power using the feedback information.

In another aspect, a method of monitoring a downlink control channel in a wireless communication system is provided. The method includes transmitting feedback information for data received on a physical downlink shared channel (PDSCH) and monitoring a physical downlink control channel (PDCCH) whose power is controlled using the feedback information.

In still another aspect, a user equipment includes a radio frequency (RF) unit for transmitting and receiving radio signals, and a processor, connected to the RF unit, transmitting feedback information for data received on a physical downlink shared channel (PDSCH), and monitoring a physical downlink control channel (PDCCH) whose power is controlled using the feedback information.

Advantageous Effects

It is possible to control power without time delay and additional use of radio resources in a VoIP service which is responsible for satisfying a fixed transmission rate in real time. Moreover, it is possible to control the power to perform PDCCH link adaptation without waste of control channels. Furthermore, it is possible to efficiently control the power even in the case where a wholeband CQI is not received in a distributed transmission mode.

MODE FOR THE INVENTION

Figure 1:
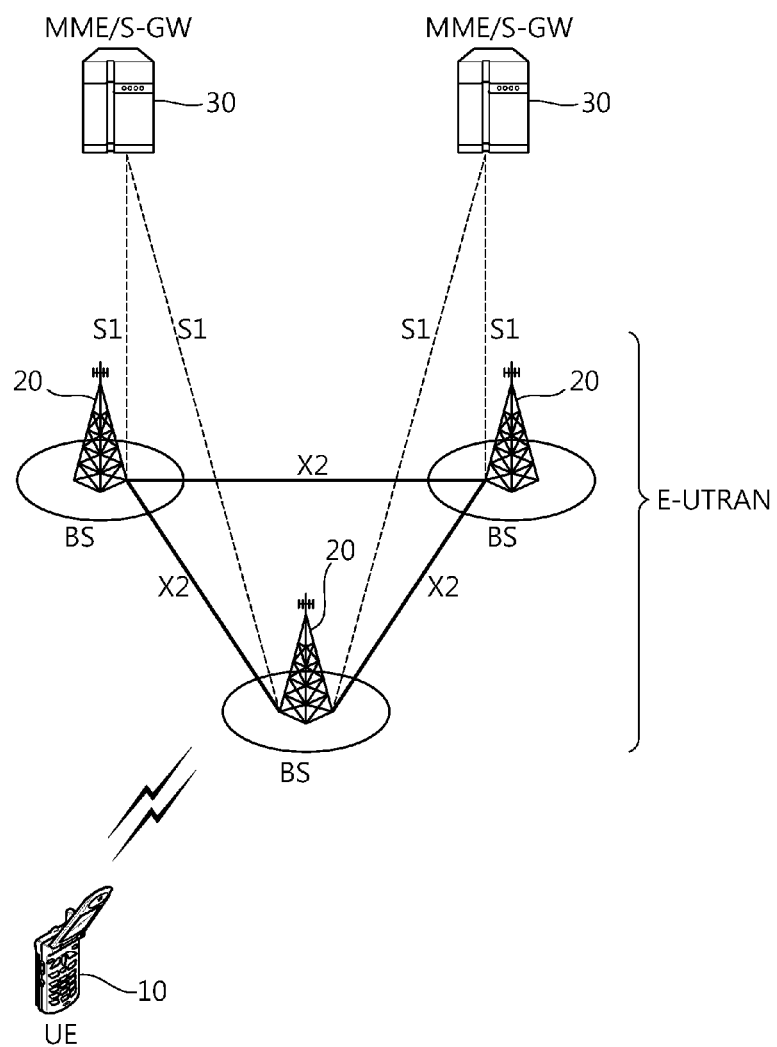
FIG. 1 is a block diagram showing a wireless communication system.

FIG. 1 is a block diagram showing a wireless communication system, which may be a network structure of an Evolved Universal Mobile Telecommunications System (E-UMTS). The E-UMTS is also referred to as a Long Term Evolution (LTE). The wireless communication system is widely deployed to provide a variety of communication services, such as voices, packet data, etc.

Referring to FIG. 1, an Evolved-UMTS Terrestrial Radio Access Network (E-UTRAN) includes a base station (BS) 20 for providing a control plane and a user plane.

A user equipment (UE) 10 may be fixed or movable and may be referred to a mobile station (MS), a user terminal (UT), a subscriber station (SS), a wireless device, etc. The base station 20 generally indicates a fixed station which communicates with the UE 10 and may be referred to as an evolved-Node B (eNB), a base transceiver system (BTS), an access point (AP), etc. The base station 209 may provides a service to at least one cell. The cell is an area in which the base station 20 provides a communication service. An interface for transmitting a user traffic or a control traffic may be used between the base stations 20. Hereinafter, downlink means communication from the base station 20 to the user equipment 10, and uplink means communication from the user equipment 10 to the base station 20.

The base stations 20 may be interconnected via an X2 interface. The base station 20 is connected to Evolved Packet Core (EPC), more specifically to a Mobility Management Entity/System Gateway (MME/S-GW) 30, via an S1 interface. The S1 interface supports a many- to-many relation between the base station 20 and the MME/S-GW 30.

Figure 2:
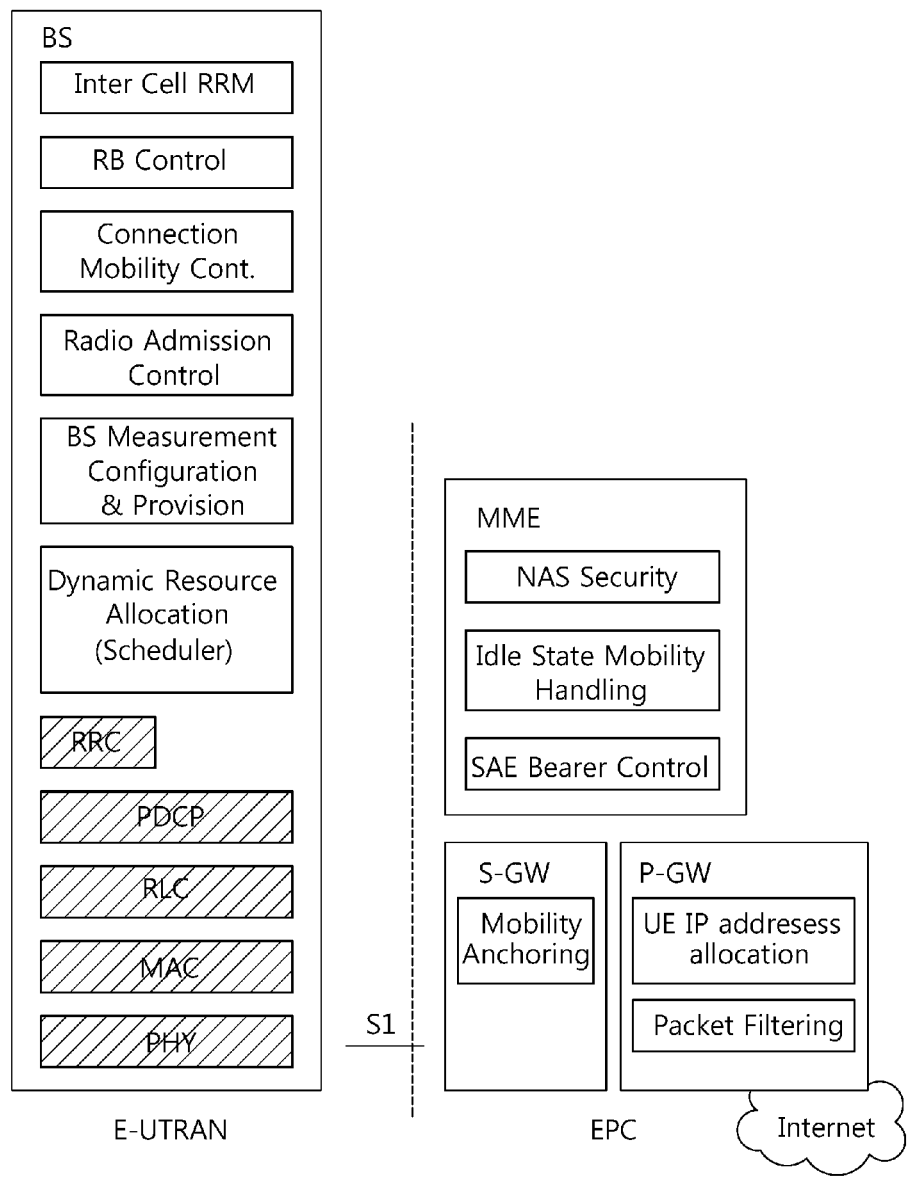
FIG. 2 is a block diagram showing a functional split between E-UTRAN and EPC.

FIG. 2 is a block diagram showing a functional split between E-UTRAN and EPC. Shaded boxes represent radio protocol layers and white boxes represent functional entities of the control plane.

Referring to FIG. 2, the base station performs the following functions: (1) radio resource management (RRM) functions such as radio bearer control, radio admission control, connection mobility control, and dynamic resource allocation; (2) Internet protocol (IP) header compression and encryption of user data streams; (3) routing of user plane data towards an S-GW; (4) scheduling and transmission of paging messages; (5) scheduling and transmission of broadcast information; and (6) measurement and measurement reporting configuration for mobility and scheduling.

The MME performs the following functions: (1) Non Access Stratum (NAS) signaling; (2) NAS signaling security; (3) Idle mode UE reachability; (4) tracking area list management; (5) roaming; and (6) authentication.

The S-GW performs the following functions: (1) mobility anchoring; and (2) lawful interception. A PDN-Gateway (P-GW) performs the following functions: (1) user equipment Internet Protocol allocation; and (2) packet filtering.

Figure 3:
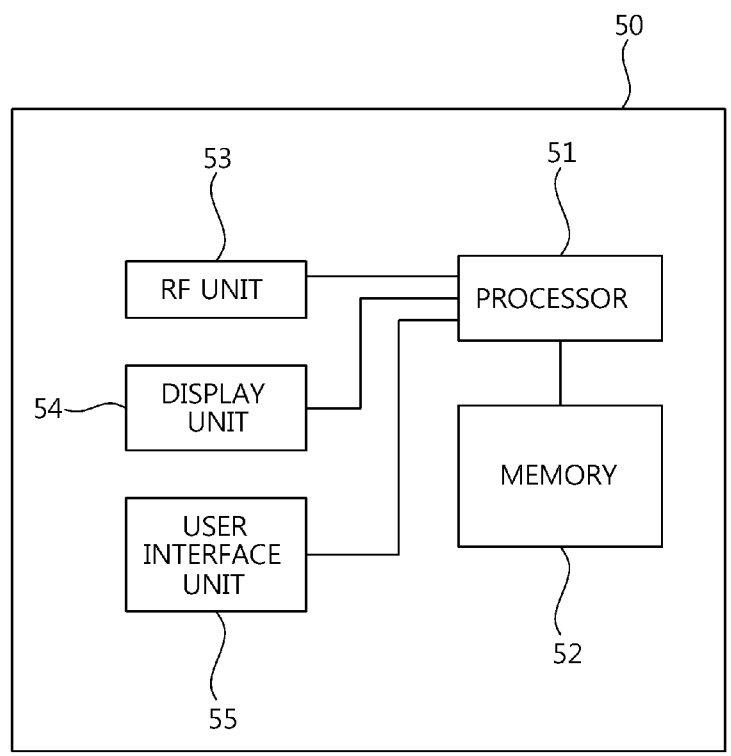
FIG. 3 is a block diagram showing constituent elements of a user equipment.

FIG. 3 is a block diagram showing constituent elements of a user equipment. The user equipment 50 includes a processor 51, a memory 52, an RF unit 53, a display unit 54, and a user interface unit 55. The processor 51 is implemented using layers of a radio interface protocol and provides the control plane and the user plane. The function of each layer may be implemented through the processor 51. The memory 52 is connected to the processor 51 and stores a user equipment operating system, applications and general files. The display unit 54 displays several pieces of information of the user equipment and may employ a well-known element such as a liquid crystal display (LCD) or an organic light emitting diode (OLED). The user interface unit 55 may be composed of a combination of well-known user interfaces such as a keypad or a touch screen. The RF unit 53 is coupled to the processor and transmits and/or receives radio signals.

The layers of the radio interface protocol between the user equipment and a network may be classified into a first layer L1, a second layer L2, and a third layer L3 on the basis of three lower layers of an open system interconnection (OSI) model which is widely known in the communication system. A physical layer belonging to the first layer provides an information transfer service using a physical channel, and a radio resource control (RRC) layer located on the third layer functions to control radio resources between the user equipment and the network. To this end, the RRC layer exchanges an RRC message between the user equipment and the network.

Figure 4:
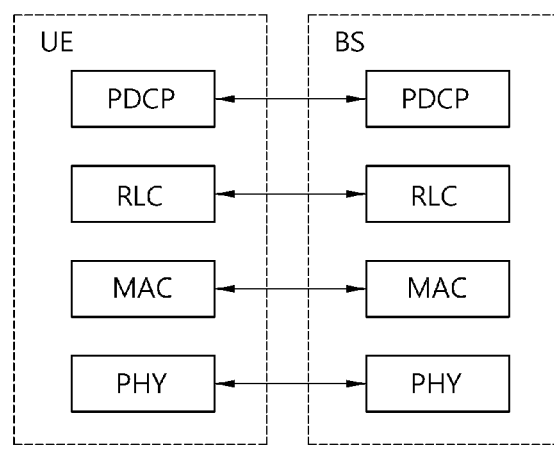
FIG. 4 is a block diagram showing a radio protocol architecture of a user plane.
Figure 5:
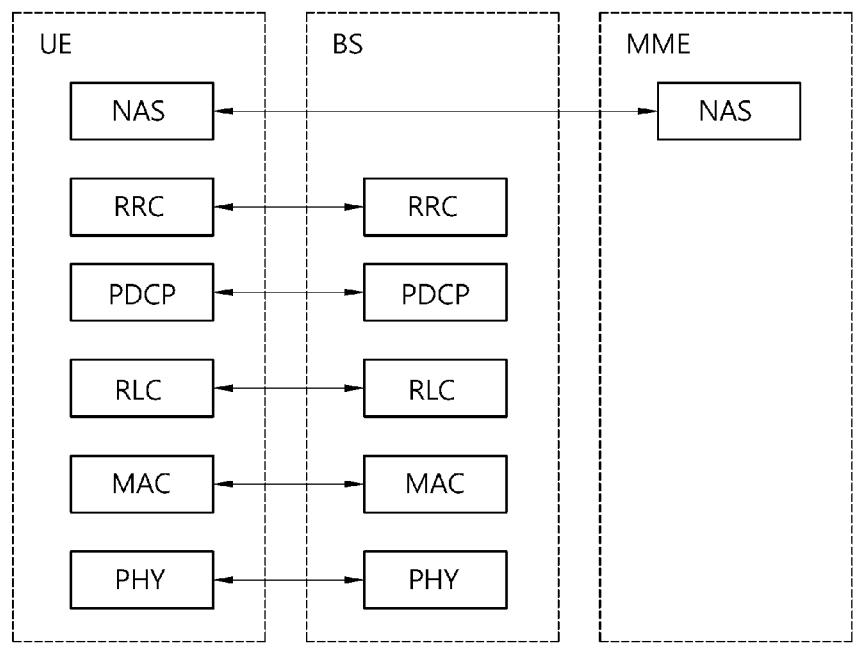
FIG. 5 is a block diagram showing a radio protocol architecture of a control plane.

FIG. 4 is a block diagram showing a radio protocol architecture of the user plane, and FIG. 5 is a block diagram showing a radio protocol architecture of the control plane, which show the architectures of the radio interface protocol between the user equipment and the E-UTRAN. The user plane is a protocol stack for transmitting user data, and the control plane is a protocol stack for transmitting control signals.

Referring to FIGS. 4 and 5, a physical layer PHY, which is the first layer, provides an information transfer service to an upper layer using a physical channel. The physical layer is connected to a medium access control (MAC) layer through a transport channel. Data moves between the MAC layer and the physical layer via the transport channel. Moreover, data moves between different physical layers, i.e., between a physical layer of a transmitter and a physical layer of a receiver, via the physical channel.

The MAC layer of the second layer provides a service to a radio link control (RLC) layer, which is the upper layer of the MAC layer, via a logical channel. The RLC layer of the second layer supports reliable data transfer. There are three operation modes in the RLC layer, such as a transparent mode (TM), an unacknowledged mode (UM), and an acknowledged mode (AM). The AM RLC provides a bidirectional data transfer service and supports retransmission in the event of a transmission failure of an RLC protocol data unit (PDU).

A packet data convergence protocol (PDCP) layer of the second layer performs the function of header compression, which reduces the size of an IP packet header.

The radio resource control (RRC) layer of the third layer is defined only on the control plane. The RRC layer serves to control the logical channel, the transport channel, and the physical channel in association with configuration, reconfiguration and release of radio bearers (hereinafter, referred to as RB). The RB means a service provided by the second layer for the data transmission between the user equipment and the E-UTRAN. If an RCC connection is established between the RCC of the user equipment and the RCC of the network, the user equipment is in an RCC connection mode, otherwise, the user equipment is in an RCC idle mode.

A Non-Access stratum (NAS) layer located on the upper layer of the RCC layer performs the functions of session management, mobility management, etc.

Figure 6:
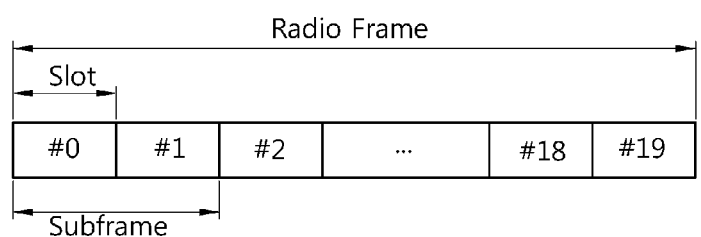
FIG. 6 shows a radio frame structure.

FIG. 6 shows a radio frame structure.

Referring to FIG. 6, the radio frame consists of ten subframes, and each subframe consists of two slots. The time taken to transmit one subframe is referred to as a transmission time interval (TTI). For example, the length of one subframe may be 1 ms, and the length of one slot may be 0.5 ms.

The radio frame structure is merely an example, and the number of subframes included in the radio frame, the number of slots included in the subframe, and the number or OFDM symbols included in the slot may be variously changed.

Figure 7:
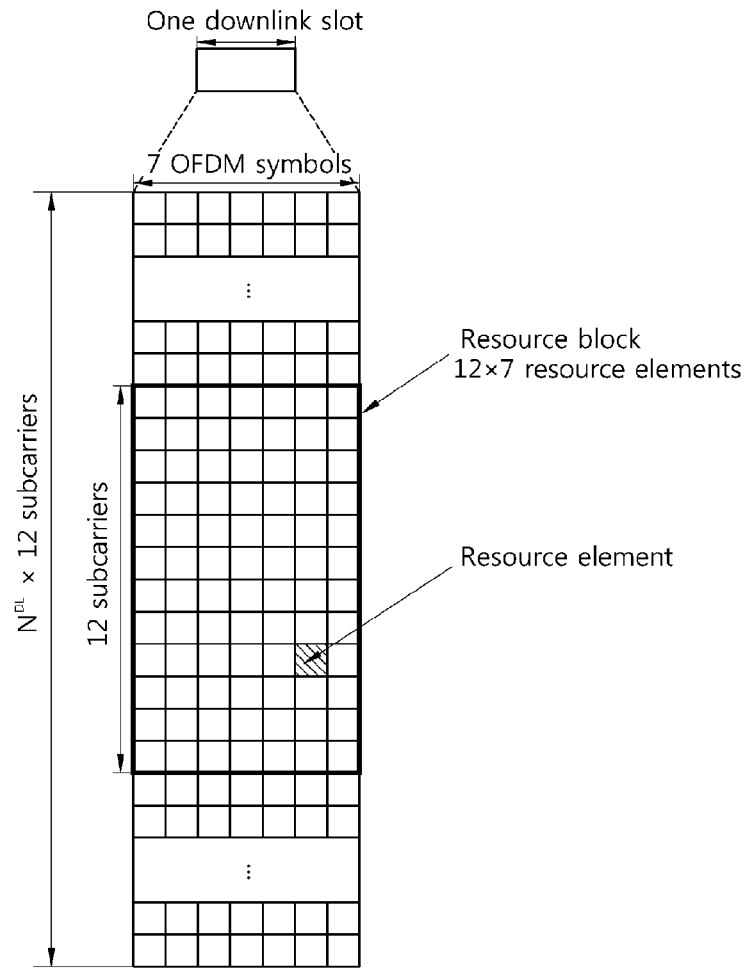
FIG. 7 shows an example of a resource grid of one downlink slot.

FIG. 7 shows an example of a resource grid of one downlink slot.

Referring to FIG. 7, the downlink slot includes a plurality of orthogonal frequency division multiplexing (OFDM) symbols in a time domain. In this case, one downlink slot includes seven OFDM symbols, and one resource block includes twelve sub-carriers in a frequency domain; however, the present invention is not limited thereto.

The respective elements on the resource grid are referred to as resource elements (RE), and one resource block includes 12×7 resource elements. The number NDL of resource blocks included in the downlink slot depends on the downlink transmission bandwidth configured in the cell.

Figure 8:
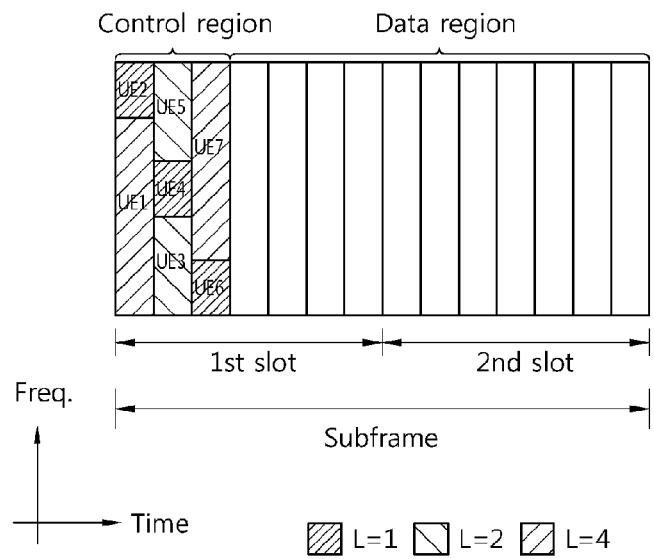
FIG. 8 shows a subframe structure.

FIG. 8 shows a subframe structure.

Referring to FIG. 8, the subframe includes two consecutive slots. Three OFDM symbols in front of the first slot in the subframe correspond to a control region to which a PDCCH is allocated, and the other OFDM symbols correspond to a data region to which a PDSCH is allocated. In addition to the PDCCH, control channels such as PCFICH, PHICH, etc., may be allocated to the control region. The user equipment can read data information transmitted over the PDSCH by decode control information transmitted over the PDCCH. Here, the control region including three OFDM symbols is merely an example. The number of OFDM symbols included in the control region in the subframe can be identified via the PCFICH.

The control region consists of a set of control channel elements (CCEs) set, i.e., a plurality of CCEs. The CCE set is a set of total CCEs constituting the control region in one subframe. The CCEs correspond to a plurality of resource element groups. For example, the CCEs may correspond to nine resource element groups. The resource element groups are used to define the mapping of the control channel with the resource elements. For example, one resource group may consist of four resource elements.

A plurality of PDCCHs multiplexed to a plurality of user equipments may be transmitted from the control region. The PDCCH carries the control information such as scheduling allocation. The PDCCH is transmitted on an aggregation of one or several consecutive control channel elements (CCEs). Hereinbelow, the number of CCEs used for PDCCH transmission is referred to as a CCE aggregation level. For example, the CCE aggregation level may be an element of {1, 2, 4, and 8}. The CCE aggregation level is the number of CCEs used for PDCCH transmission and a CCE unit to search for the PDCCH. The size of the CCE aggregation level is defined as the number of adjacent CCEs. The CCE aggregation levels of the user equipments may be different. For example, in FIG. 8, the CCE aggregation level L of second, fourth, and sixth user equipments UE2, UE4, and UE6 is 1. The CCE aggregation level L of third and fifth user equipments UE3 and UE5 is 2, and the CCE aggregation level L of first and seventh user equipments UE1 and UE7 is 4.

The reason that the CCE aggregation levels of the respective user equipments are different is that formats of the control information loaded on the PDCCH or modulation and coding scheme (MCS) levels are different.

First, the format of the control information will be described. The control information transmitted on the PDCCH is referred to as downlink control information (hereinafter, referred to as DCI). The DCI transmits uplink or downlink scheduling information, uplink power control commands, control information for paging, control information for indicating a random access response, and the like. The configuration of information loaded on a PDCCH payload may be changed according to the format of the DCI. The PDCCH payload is an information bit.

Next, the relationship between the MCS level and the CCE aggregation level will be described.

The MCS level represents a code rate used for data coding and a modulation order. An adaptive MCS level is used for link adaptation. In general, about three to four MCS levels may be considered in the control channel that transmits the control information.

The reason that the CCE aggregation levels of the respective user equipments are different is that the code rate and the modulation order of the control information are different. For example, binary phase shift keying (BPSK) is used in the case where the modulation order is 2, quadrature phase shift keying (QPSK) is used in the case where the modulation order is 4, and quadrature amplitude modulation (QAM) is used in the case where the modulation order is 6. Otherwise, the CCE aggregation levels of the respective user equipments may be different even in the case where the modulation order of the control information in the user equipment is fixed and only the code rate differs. That is, the reason that the CCE aggregation levels of the respective user equipments are different is that the MCS levels loaded on the PDCCH are different.

For example, it is assumed that the MCS level uses only one QPSK as the modulation order and uses 2/3, 1/3, 1/6 or 1/12 as the code rate. In the PDCCH on which the control information in which the MCS level uses the code rate of 2/3 is loaded, the CCE aggregation level is 1 based on a basic length unit. The PDCCH on which the control information in which the MCS level uses the code rate of 1/3 is loaded has a length greater than two times the basic length unit. That is, the CCE aggregation level is 2. The PDCCH on which the control information in which the MCS level uses the code rate of 1/6 is loaded has a length greater than four times the basic length unit. That is, the CCE aggregation level is 4. The PDCCH on which the control information in which the MCS level uses the code rate of 1/12 is loaded has a length greater than eight times the basic length unit. That is, the CCE aggregation level is 8.

Generally, the data transmission power on the PDSCH can be controlled using channel quality indicator (CQI) information. However, as a method of controlling the transmission power of the control signal on the PDCCH has not been proposed, it is necessary to provide a method of controlling the transmission power of the control signal on the PDCCH.

Next, a method of providing a VoIP packet service, which is a typical example of the persistent scheduling, will be described.

Figure 9:
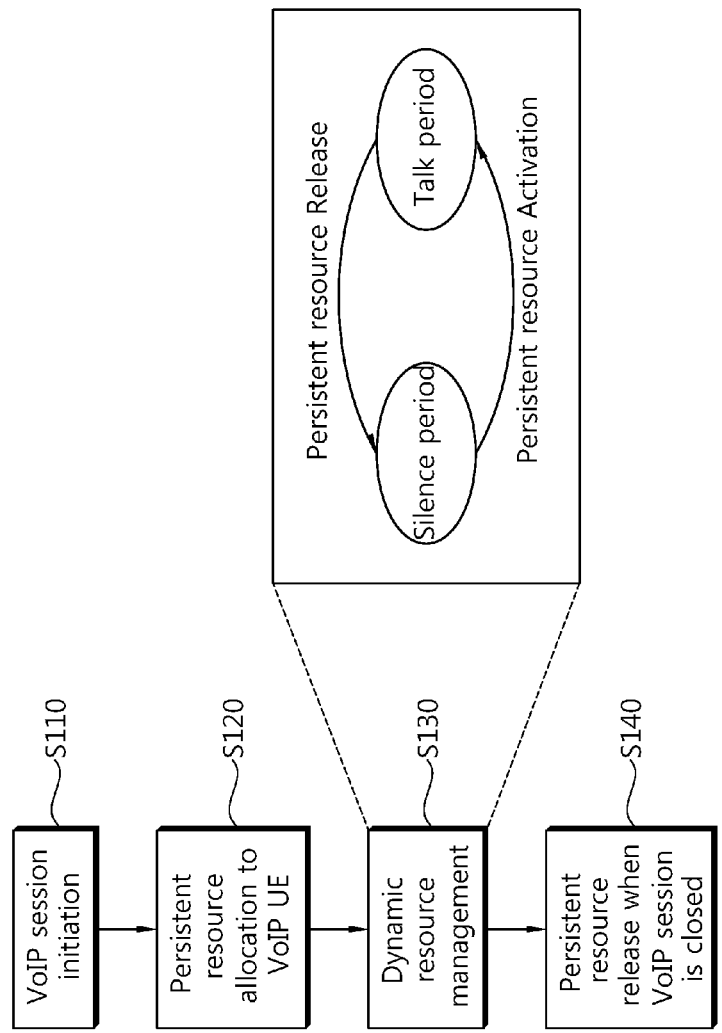
FIG. 9 shows an example of a method of managing radio resources in a VoIP service.

FIG. 9 shows an example of a method of managing radio resources in a VoIP service.

Referring to FIG. 9, if the user equipment requests a Voice over Internet Protocol (VoIP) service to the base station or if the base station provides the VoIP service to the user equipment, the base station initiates a VoIP session (S110). The VoIP is a communication service technique that converts voice data into Internet protocol data packet to enable calls over Internet. The VoIP packet represents a voice packet using the VoIP.

The base station allocates a radio resource for transmitting and receiving the VoIP packet (S120). The VoIP service is a real-time service which is responsible for transmitting and receiving data without delay, and a persistent radio resource for the VoIP packet is allocated in a frequency-time domain. At this time, the base station informs the user equipment of the information such as a modulation and coding scheme (MCS) which is applied to transmission and reception of the VoIP packet.

The base station dynamically manages the persistent radio resource (hereinafter, referred to as a VoIP radio resource) allocated for the transmission and reception of the VoIP packet (S130). The transmission and reception of the VoIP packet between the base station and the user equipment are not persistently made. A VoIP service period in which the transmission and reception of the VoIP packet are persistently made is called a talk period, and a VoIP service period in which the transmission and reception of the VoIP packet are temporarily stopped is called a silence period. That is, the VoIP service may be divided into the talk period and the silence period according to whether the radio resource is allocated. Although the persistent radio resource is allocated for the transmission and reception of the VoIP packet, the talk period and the silence period may be repeated in the actual VoIP service between the base station and the user equipment. No data is loaded on the radio resource allocated during the silence period, which is a waste of the radio resources. Therefore, in order to reduce the waste of the radio resources, the base station releases the VoIP radio resource (persistent resource release) and declares the silence period in the case where there is no transmission and reception of the VoIP packet for a predetermined time or according to a given condition. At this time, the released VoIP radio resource is allocated to another user or used to transmit another data. When the base station that has declared the silence period is requested to retransmit the VoIP packet from the user equipment or when there is a VoIP packet to be transmitted to the user equipment, the base station activates the VoIP radio resource (persistent resource activation) and declares the talk period.

Upon completion of the VoIP session between the base station and the user equipment, the base station releases the allocated radio resource and terminates the VoIP service (S140).

Figure 10:
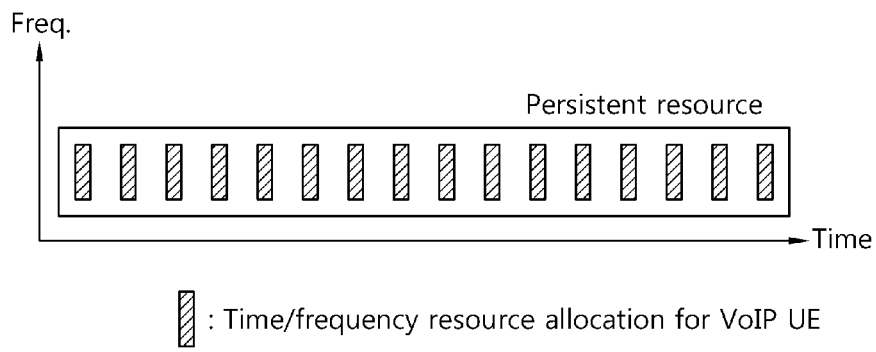
FIG. 10 shows an example of a persistent radio resource allocated for transmission and reception of a VoIP packet.

FIG. 10 shows an example of a persistent radio resource allocated for transmission and reception of the VoIP packet.

Referring to FIG. 10, the VoIP radio resource occupies a persistent resource domain in the frequency-time domain. In general, the domain of the VoIP radio resource occupies a consistent frequency-time domain until the VoIP session is terminated. Uplink and downlink radio resources in the same frequency domain are periodically allocated as the VoIP radio resources according to the generation interval of the VoIP packets.

Figure 11:
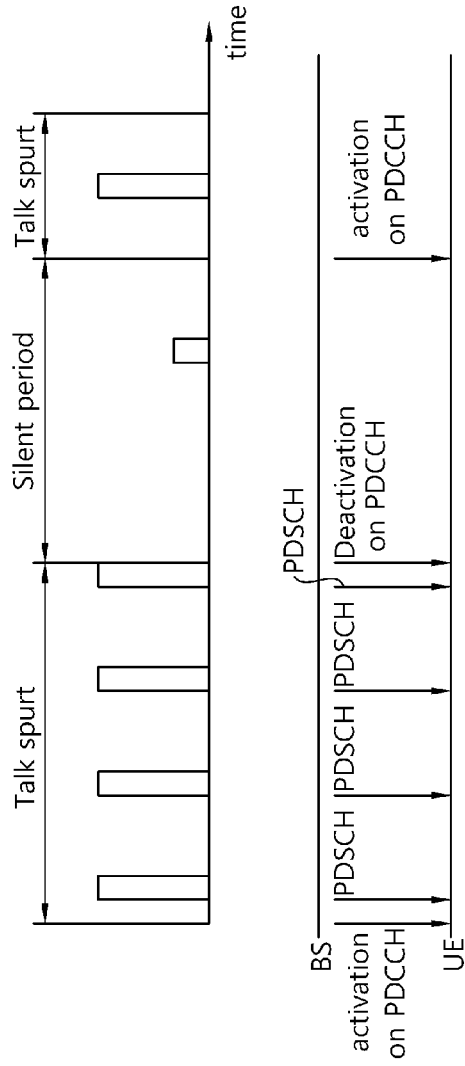
FIG. 11 shows an example of a traffic model in VoIP.

FIG. 11 shows an example of a traffic model in the VoIP.

Referring to FIG. 11, the voice packets generated in the VoIP may be classified into packets generated in the talk period (talkspurt) and packets generated in the silence period. For example, assuming that an adaptive multi-rate (AMR) is 12.2 kbps, a RTP packet is generated every 20 ms in the talk period and has a size of 35 to 49 bytes. In the silence period, the RTP packet is generated every 160 ms and has a size of 10 to 24 bytes.

If the packets are generated at a predetermined interval in the voice service such as VoIP, the size of the generated packets is relatively small and fixed. Accordingly, the VoIP generally employs the persistent scheduling. In the persistent scheduling, the radio resources are persistently allocated by predicting radio bearers in the process of controlling the radio bearers, and thus the packets can be transmitted or received without the control signal including scheduling information.

The base station transmits the control information that indicates activation to the user equipment on the PDCCH at the start point of the talk period. During the talk period, the user equipment can receive the VoIP data on the PDSCH from the base station. Moreover, the base station transmits the control information that indicates deactivation to the user equipment over the PDCCH at the start point of the silence period. In this case, it is necessary to provide a method of controlling power of the data transmitted from the base station to the user equipment.

Next, the method of controlling power will be described. The method of controlling power can be efficiently used in a system employing PDCCH link adaptation or persistent scheduling.

Figure 12:
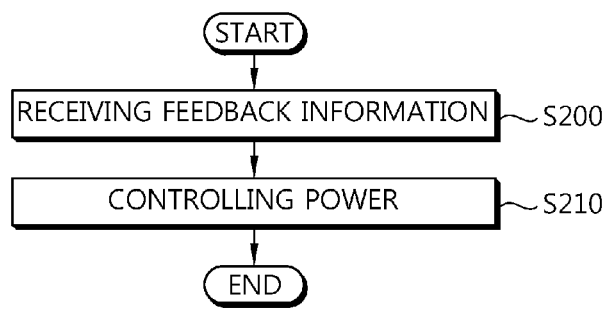
FIG. 12 is a flowchart showing a method of controlling power in accordance with an embodiment of the present invention.

FIG. 12 is a flowchart showing a method of controlling power in accordance with an embodiment of the present invention.

Referring to FIG. 12, the base station receives feedback information from the user equipment (S200). Here, the feedback information includes ACK/NACK information, which is a response from the user equipment to the data transmission of the base station, CQI value that indicates the downlink channel quality, etc. The CQI value may include CQI value for a subband in a localized transmission mode, and an average CQI of subbands, a wideband CQI and a wholeband CQI, etc. in a distributed transmission mode. Apart from this, the base station may also receive an overload indicator of a cell from a neighboring cell via an X2 interface.

The base station controls the power using the received feedback information (S210). Moreover, the base station may further use the overload indicator of the cell received from the neighboring cell to control the power.

Since the base station uses only the ACK/NACK information and the CQI value received from the user equipment, and the overload indicator received from the neighboring cell, it is not necessary to employ an additional control channel, and it is possible to save the radio resources.

The user equipment can monitor the downlink control channel with respect to the power control of the base station. That is, the user equipment transmits feedback information for the data received on the physical downlink shared channel (PDSCH) and monitors the physical downlink control channel (PDCCH) whose power is controlled using the feedback information. Here, the feedback information may be the ACK/NACK information and/or the CQI value for the transmitted data.

The user equipment monitoring the downlink control channel includes a radio frequency (RF) unit for transmitting and receiving radio signals, and a processor, connected to the RF unit, transmitting feedback information for data received on the PDSCH, and monitoring the PDCCH whose power is controlled using the feedback information.

Next, the method of controlling power will be described in detail according to the kinds of the received feedback information.

[Power Control Using ACK/NACK]

When the user equipment transmits only the ACK/NACK information of the physical downlink shared channel (PDSCH) to the base station in the case where the persistent scheduling to the downlink or the PDCCH link adaptation is performed, the base station can control the transmission power with respect to the corresponding user equipment using the ACK/ANCK information received from the user equipment.

Figure 13:
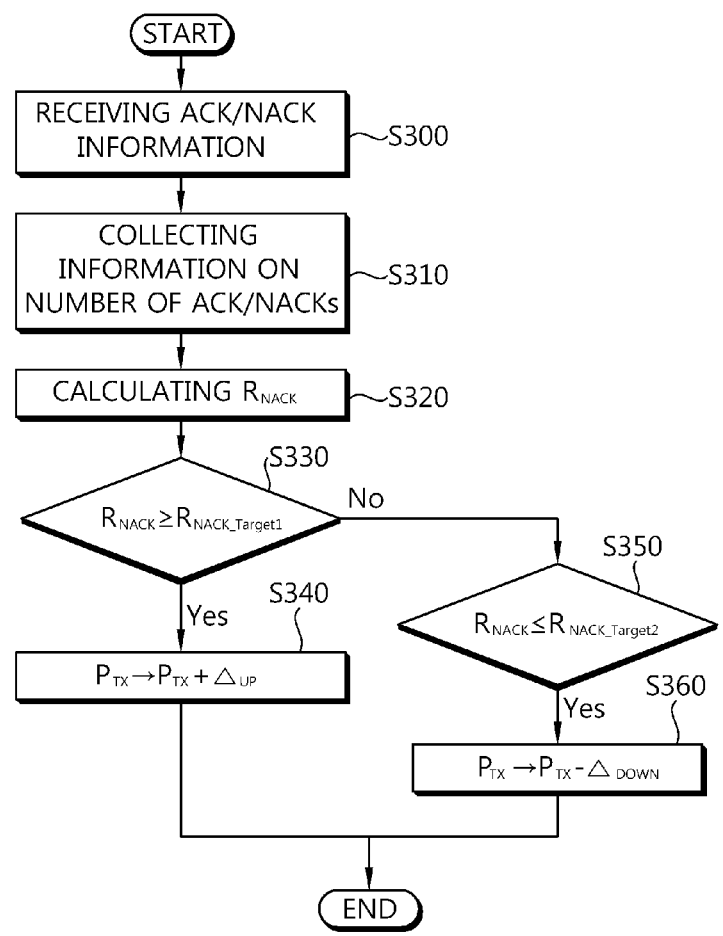
FIG. 13 is a flowchart showing a method of controlling power in accordance with another embodiment of the present invention.

FIG. 13 is a flowchart showing a method of controlling power in accordance with another embodiment of the present invention.

Referring to FIG. 13, the base station receives ACK/NACK information for data transmission from the user equipment (S300). Here, the ACK/NACK information represents ACK/NACK information for the data packet that the base station has already transmitted to the user equipment. It is assumed that the base station receives only the ACK/NACK information from the user equipment and does not receive any feedback information except the ACK/NACK information.

Next, the base station collects information on the number of ACK/NACKs on a time window $N_{Win}$ (S310). The number of ACK/NACKs may represent any one of the number of ACK/NACKs for initial transmission on the time window $N_{Win}$, the number of ACK/NACKs for retransmission, and the number of ACK/NACKs for all transmissions including the initial transmission and the retransmission. The time window $N_{Win}$ may be arbitrarily configured.

Then, the base station calculates a NACK generation rate ($R_{NACK}$) based on information on the number of ACK/NACKs (S320). Here, the NACK generation rate($R_{NACK}$) may be the number of NACKs/(the number of ACKs+the number of NACKs).

Subsequently, the base station compares the NACK generation rate with a first reference NACK generation rate ($R_{NACK\_Target1}$) (S330) and, if the NACK generation rate is equal to or greater than the first reference NACK generation rate, the base station increases the power (S340). Here, the first reference NACK generation rate may be arbitrarily configured, and an increased amount of the power may be a fixed or variable value. Since the fact that the NACK generation rate is equal to or greater than the first reference NACK generation rate means that the channel state is not good, the base station increases the power to improve the channel state.

As a result of the comparison in S330, if the NACK generation rate is smaller than the first reference NACK generation rate, the base station compares the NACK generation rate with a second reference NACK generation rate ($R_{NACK\_Target2}$) (S350) and, if the NACK generation rate is equal to or smaller than the second reference NACK generation rate, the base station reduces the power (S360). Here, the second reference NACK generation rate may be arbitrarily configured by the base station, and a reduced amount of the power may be a fixed or variable value. Since the fact that the NACK generation rate is equal to or smaller than the second reference NACK generation rate means that the channel state is pretty good and power is wasted, it is possible to prevent waste of power by reducing the power.

The first reference NACK generation rate may be equal to or different from the second reference NACK generation rate. If the NACK generation rate is smaller than the first reference NACK generation rate and greater than the second reference NACK generation rate, it is possible to maintain the current power as it is.

If the power increase in S340 or the power reduction in S360 consecutively occurs more than a predetermined number of times, the base station may update the current power. The update may be performed periodically or aperiodically (event triggering). Moreover, the time period for applying the method of controlling power in accordance with the embodiment of FIG. 13 may be arbitrarily configured by the base station.

FIG. 13 illustrates the method of estimating the channel state based on the NACK generation rate and controlling the power based on the channel state; however, the method is not limited thereto. For example, the base station may estimate the channel state based on the ACK generation rate calculated using the ACK/NACK information on the time window received from the user equipment or estimate the channel state based on the data retransmission rate. The method of controlling the power by estimating the channel state based on the ACK generation rate or based on the data retransmission rate will be readily appreciated by those skilled in the art from the method illustrated in FIG. 13.

The base station can control the power using only the ACK/NACK information received from the user equipment for the downlink persistent scheduling or the PDCCH link adaptation. As a result, since the base station does not use an additional control channel, it is possible to prevent waste of radio resources.

[Power Control Using ACK/NACK and CQI]

When the user equipment transmits the ACK/NACK information of the PDSCH and the CQI value that indicates the channel quality to the base station in the case where the persistent scheduling to the downlink or the PDCCH link adaptation is performed, the base station can control the transmission power with respect to the corresponding user equipment using the ACK/ANCK information and the CQI value received from the user equipment. Here, the CQI value may represent CQI value by a subband in a localized transmission mode, and an average CQI of subbands, a wideband CQI, and a wholeband CQI in a distributed transmission mode.

If the base station does not receive the wholeband CQI from the user equipment in the distributed transmission mode, a method of obtaining an average CQI of subbands is required. If a Best M CQI ($CQI_{BEST\_M}$) and an average CQI ($CQI_{AVG}$) of the residual subbands are simultaneously or respectively received from the user equipment, the average CQI of the subbands for the power control of the PDCCH may be $\alpha CQI_{BEST\_M}+\beta CQ1_{AVG}$, wherein $\alpha$ and $\beta$ may be arbitrarily configured. Moreover, the average CQI of the subbands for the power control of the PDCCH may be an average value of a value obtained by adding an offset to the $CQI_{BEST\_M}$ and a value of the $CQI_{AVG}$. The offset may be a predetermined or variable value.

Figure 14:
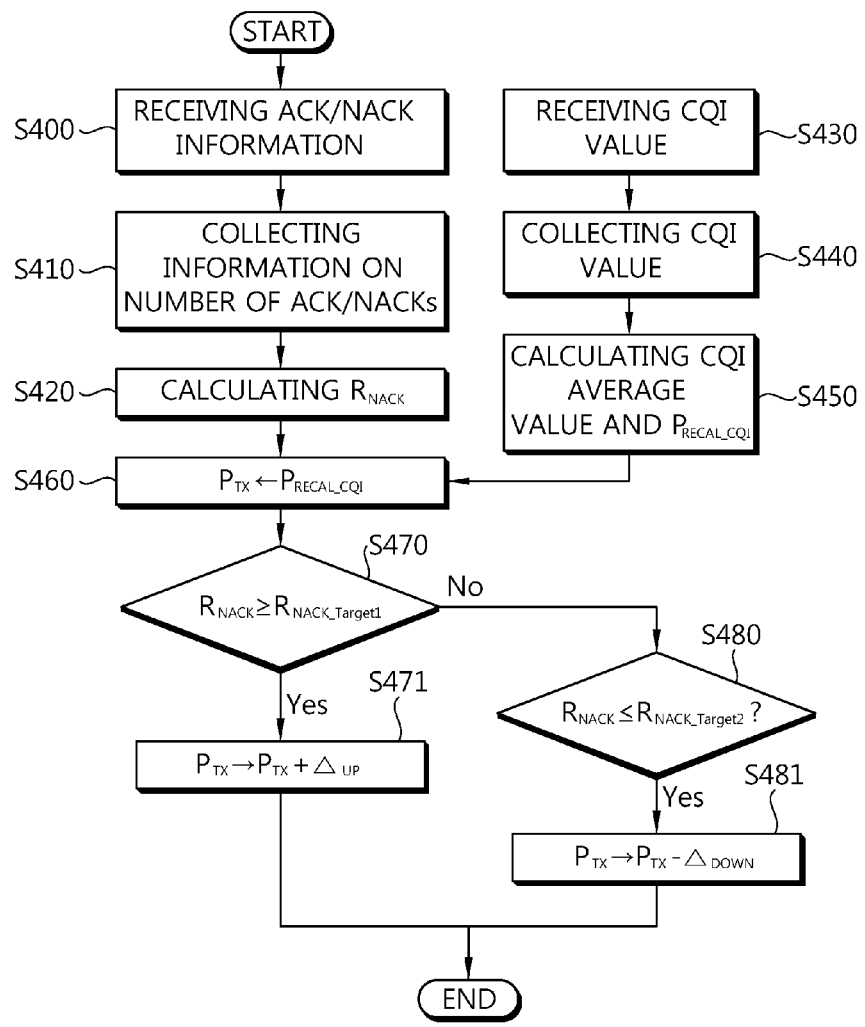
FIG. 14 is a flowchart showing a method of controlling power in accordance with still another embodiment of the present invention.

FIG. 14 is a flowchart showing a method of controlling power in accordance with still another embodiment of the present invention.

Referring to FIG. 14, the base station receives ACK/NACK information from the user equipment (S400). Here, the ACK/NACK information represents ACK/NACK information for the data packet that the base station has transmitted to the user equipment.

Next, the base station collects information on the number of ACK/NACKs on a time window $N_{Win}$ (S410). The number of ACK/NACKs may represent any one of the number of ACK/NACKs for initial transmission on the time window $N_{Win}$, the number of ACK/NACKs for retransmission, and the number of ACK/NACKs for all transmissions including the initial transmission and the retransmission. The time window $N_{Win}$ may be arbitrarily configured.

Then, the base station calculates a NACK generation rate $R_{NACK}$ (S420). Here, the NACK generation rate $R_{NACK}$ is a NACK generation rate for a predetermined number of data and may be the number of NACKs/(the number of ACKs+the number of NACKs).

Apart from this, the base station receives CQI value from the user equipment (S430) and collects the CQI value on a time window $M_{Win}$. The time window $M_{Win}$ may be arbitrarily configured. The CQI value represents a CQI of a subband in a localized transmission mode, and a wholeband CQI or an average CQI in a distributed transmission mode. The method of obtaining an average CQI in the distributed transmission mode is described above.

Next, the base station calculates an average value of the CQIs on the time window $M_{Win}$ using the CQI value and calculates a target power value ($P_{RECAL\_CQI}$) using the average value of the CQIs (S450). In order to calculate the target power value ($P_{RECAL\_CQI}$), the base station calculates a signal to interference and noise ratio (SINR) of the user equipment using the average value of the CQIs on the time window $M_{Win}$. When the SINR is calculated, the base station calculates the target power value ($P_{RECAL\_CQI}$) so that a transmission error in a specific modulation and coding scheme(MCS) is lower than a specific block error rate (BLER). Here, the specific MCS is arbitrarily fixed in the case of the persistent scheduling or semi-statically changed in the case of the PDCCH link adaptation.

Next, the base station compensates for the transmission power to the calculated target power value ($P_{RECAL\_CQI}$) (S460).

Then, the base station compares the NACK generation rate calculated in S420 with a first reference NACK generation rate ($R_{NACK\_Target1}$) (S470) and, if it is determined that the NACK generation rate is equal to or greater than the first reference NACK generation rate, the base station increases the transmission power (S471). Here, the first reference NACK generation rate may be arbitrarily configured, and an increased amount of the power may be a fixed or variable value. Since the fact that the NACK generation rate is equal to or greater than the first reference NACK generation rate means that the channel state is not good, the base station may increase the power to improve the channel state.

As a result of the comparison in S470, if the NACK generation rate is smaller than the first reference NACK generation rate, the base station compares the NACK generation rate with a second reference NACK generation rate ($R_{NACK\_Target2}$) (S480) and, if the NACK generation rate is equal to or smaller than the second reference NACK generation rate, the base station reduces the transmission power (S481). Here, the second reference NACK generation rate may be arbitrarily configured by the base station, and a reduced amount of the power may be a fixed or variable value. Since the fact that the NACK generation rate is equal to or smaller than the second reference NACK generation rate means that the channel state is pretty good and a portion of the power is wasted.

The first reference NACK generation rate may be equal to or different from the second reference NACK generation rate. If the NACK generation rate is smaller than the first reference NACK generation rate or greater than the second reference NACK generation rate, it is possible to maintain the current power as it is.

Calculating the target power value using the CQI value and compensating for the transmission power In S430 to S460 may be performed periodically or aperiodically.

FIG. 14 illustrates the method of estimating the channel state based on the NACK generation rate and controlling the power based on the channel state; however, the method is not limited thereto. For example, the base station may estimate the channel state based on the ACK generation rate calculated using the ACK/NACK information on the time window received from the user equipment or estimate the channel state based on the data retransmission rate. The method of controlling the power by estimating the channel state based on the ACK generation rate or the data retransmission rate will be readily appreciated by those skilled in the art from the method illustrated in FIG. 14.

The base station can control the power using the ACK/NACK information and the CQI value received from the user equipment for the downlink persistent scheduling or the PDCCH link adaptation. As a result, since the base station does not use an additional control information, it is possible to save the radio resources. Moreover, it is possible to easily control the power using the average CQI even in the case where the wholeband CQI is not received in the distributed transmission mode.

Figure 15:
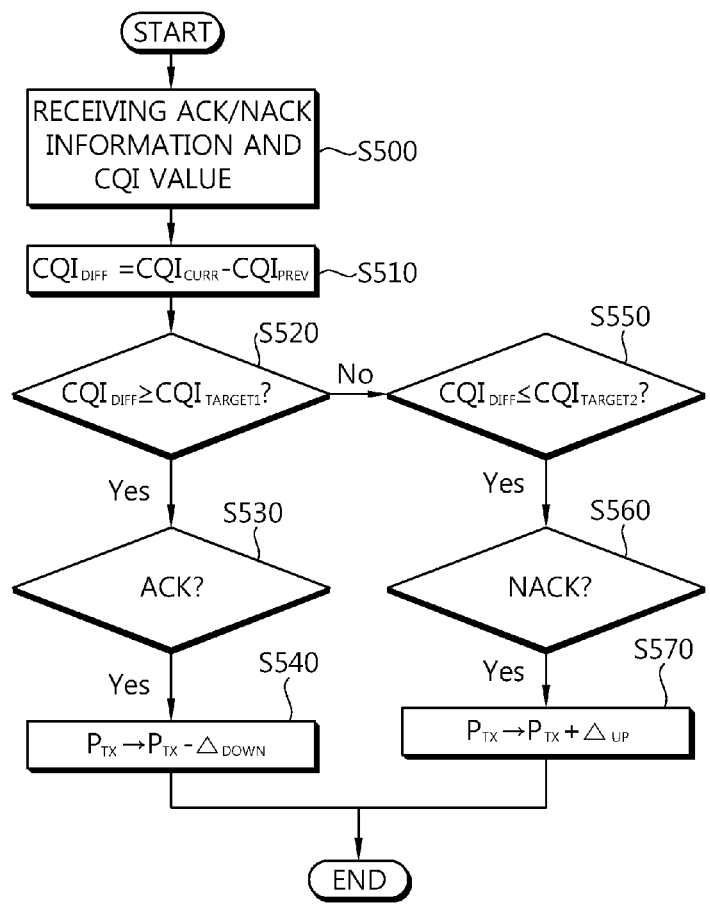
FIG. 15 is a flowchart showing a method of controlling power in accordance with yet another embodiment of the present invention.

FIG. 15 is a flowchart showing a method of controlling power in accordance with yet another embodiment of the present invention.

Referring to FIG. 15, the base station receives feedback information from the user equipment (S500). The feedback information may be ACK/NACK information for data transmission of the base station and CQI value.

The base station calculates a CQI change amount ($CQI_{DIFF}$) using the CQI (S510). The CQI change amount ($CQI_{DIFF}$) represents a difference between a current CQI ($CQI_{CURR}$) and a previous CQI ($CQI_{PREV}$) ($CQI_{DIFF}=CQI_{CURR}-CQI_{PREV}$).

Next, the base station compares the CQI change amount ($CQI_{DIFF}$) with a first reference CQI change amount ($CQI_{TARGET1}$) (S520) and, if the CQI change amount ($CQI_{DIFF}$) is equal to or greater than the first reference CQI change amount ($CQI_{TARGET1}$), the base station determines whether the feedback information received in S400 includes ACK (S530). The first reference CQI change amount ($CQI_{TARGET1}$) may be arbitrarily configured by the base station. If it is determined that the feedback information includes ACK in S530, the base station reduces the power (S540). Since the fact that the CQI change amount ($CQI_{DIFF}$) is equal to or greater than the first reference CQI change amount ($CQI_{TARGET1}$) and the ACK for the previous data transmission has been received means that the channel state is pretty good, it is possible to reduce the power.

If the CQI change amount ($CQI_{DIFF}$) is smaller than the first reference CQI change amount ($CQI_{TARGET1}$), the base station compares the CQI change amount ($CQI_{DIFF}$) with a second reference CQI change amount ($CQI_{TARGET2}$) (S550). Here, the second reference CQI change amount ($CQI_{TARGET2}$) may be arbitrarily configured.

If the CQI change amount ($CQI_{DIFF}$) is equal to smaller than the second reference CQI change amount ($CQI_{TARGET2}$) in S550, the base station determines whether the feedback information received in S500 includes NACK (S560) and, if it is determined that the feedback information includes NACK, the base station increases the power (S570).

If the feedback information includes NACK in S530 or if the feedback information includes ACK in S560, and if the CQI change amount ($CQI_{DIFF}$) is smaller than the first reference CQI change amount ($CQI_{TARGET1}$) and greater than the second reference CQI change amount ($CQI_{TARGET2}$), it is possible to maintain the current power as it is.

In FIG. 15, the feedback period of the CQI value and that of the ACK/NACK information may be equal to or different from each other. If the feedback period of the CQI value and that of the ACK/NACK information are different from each other, whether or not the feedback information includes ACK or NACK in S530 or in S560 is determined using the most recently received ACK/NACK information.

Moreover, the reduced amount of power in S540 and the increased amount of power in S570 may be fixed or variable values.

The base station controls the power using the CQI value and the ACK/NACK information fed back from the user equipment. Accordingly, the base station does not require additional radio resources to control the power.

Figure 16:
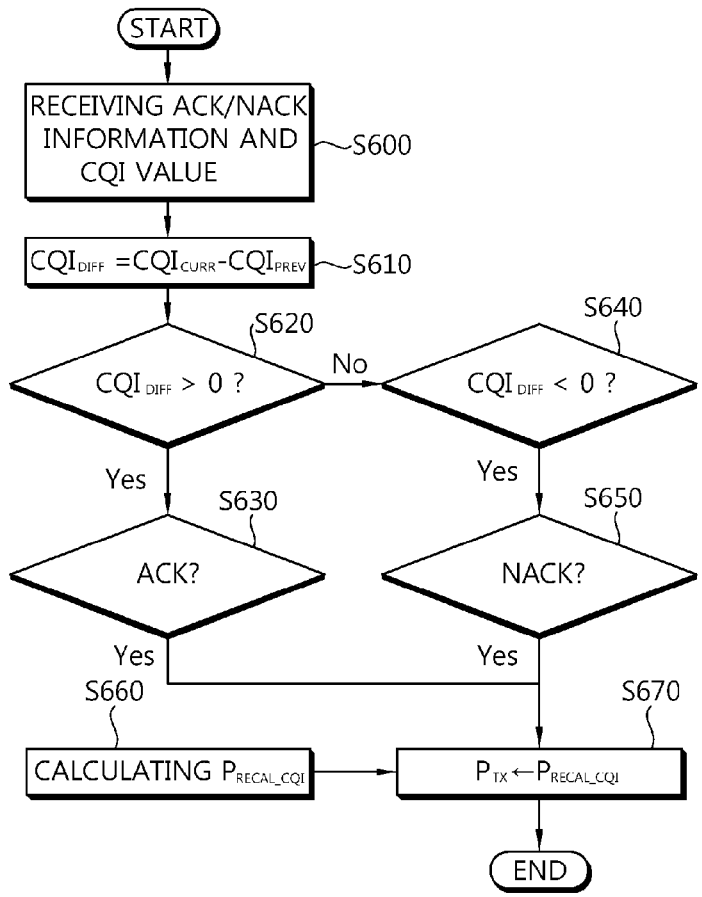
FIG. 16 is a flowchart showing a method of controlling power in accordance with still yet another embodiment of the present invention.

FIG. 16 is a flowchart showing a method of controlling power in accordance with still yet another embodiment of the present invention.

Referring to FIG. 16, the base station receives feedback information from the user equipment (S600). The feedback information may be ACK/NACK information for data transmission of the base station and CQI value.

The base station calculates a CQI change amount ($CQI_{DIFF}$) using the CQI (S610). The CQI change amount ($CQI_{DIFF}$) represents a difference between a current CQI ($CQI_{CURR}$) and a previous CQI ($CQI_{PREV}$) ($CQI_{DIFF}=CQI_{CURR}-CQI_{PREV}$).

Next, the base station determines whether the CQI change amount ($CQI_{DIFF}$) calculated in S610 has a positive value (S620) and, if the CQI change amount ($CQI_{DIFF}$) has the positive value, the base station determines whether the feedback information received in S600 is ACK (S630).

If the CQI change amount ($CQI_{DIFF}$) does not have a positive value in S620, the base station determines whether the CQI change amount ($CQI_{DIFF}$) has a negative value (S640).

If the CQI change amount ($CQI_{DIFF}$) has the negative value, the base station determines whether the feedback information received in S600 is NACK (S650).

Apart from this, the base station calculates a target power value ($P_{RECAL\_CQI}$) using the CQI value received in S600 (S660). In order to calculate the target power value ($P_{RECAL\_CQI}$), the base station calculates a signal to interference and noise ratio (SINR) of the user equipment using the average value of the CQIs. When the SINR is calculated, the base station calculates the target power value ($P_{RECAL\_CQI}$) so that a transmission error in a specific modulation and coding scheme(MCS) is lower than a specific block error rate (BLER). Here, the specific MCS is arbitrarily fixed in the case of the persistent scheduling or semi-statically changed in the case of the PDCCH link adaptation.

If it is determined that the feedback information is ACK in S630, or if it is determined that the feedback information is NACK in S650, the base station compensates for the transmission power to the target power value ($P_{RECAL\_CQI}$) calculated in S670.

If the feedback information is NACK in S630, if the feedback information is ACK in S650, and if there is no CQI change amount, it is possible to maintain the current power as it is.

In FIG. 16, the feedback period of the CQI value and that of the ACK/NACK information may be equal to or different from each other. If the feedback period of the CQI value and that of the ACK/NACK information are different from each other, whether or not the feedback information is ACK or NACK in S630 or in S650 is determined using the most recently received ACK/NACK information.

The base station controls the power using the CQI value and the ACK/NACK information fed back from the user equipment. Accordingly, the base station does not require additional radio resources to control the power.

Additionally, if the NACK consecutively occurs more than a predetermined number of times, it is possible to increase the power to a predetermined level by a method different from those of FIGS. 14 to 16. Moreover, in the case where the power control is performed by one of the methods of FIGS. 14 to 16, if the NACK occurs more than a predetermined number of times for a predetermined time, or if it is determined that the current power control method is inappropriate, the other methods of FIGS. 14 to 16 may be sequentially or randomly employed.

Moreover, if the base station that has transmitted a signal to a specific user equipment does not receive any feedback information from the corresponding user equipment, the base station determines that the channel state is not good and increases the power to a predetermined level.

[Power Control Using CQI]

When the user equipment transmits the CQI value that indicates the channel quality to the base station in the case where the persistent scheduling to the downlink or the PDCCH link adaptation is performed, the base station can control the transmission power for the corresponding user equipment using the CQI value received from the user equipment. Here, the CQI value may represent CQI value of a subband in a localized transmission mode, and an average CQI of subbands, a wideband CQI, and a wholeband CQI in a distributed transmission mode.

If the base station does not receive the wholeband CQI from the user equipment in the distributed transmission mode, a method of obtaining an average CQI of subbands is required. If a Best M CQI ($CQI_{BEST\_M}$) and an average CQI ($CQI_{AVG}$) of the residual subbands are simultaneously or respectively received from the user equipment, the average CQI of the subbands for the power control of the PDCCH may be $\alpha CQI_{BEST\_M} + \beta CQI_{AVG}$, wherein $\alpha$ and $\beta$ may be arbitrarily configured. Moreover, the average CQI of the subbands for the power control of the PDCCH may be an average value of a value obtained by adding an offset to the $CQI_{BEST\_M}$ and a value of the $CQI_{AVG}$. The offset may be a predetermined or variable value.

Figure 17:
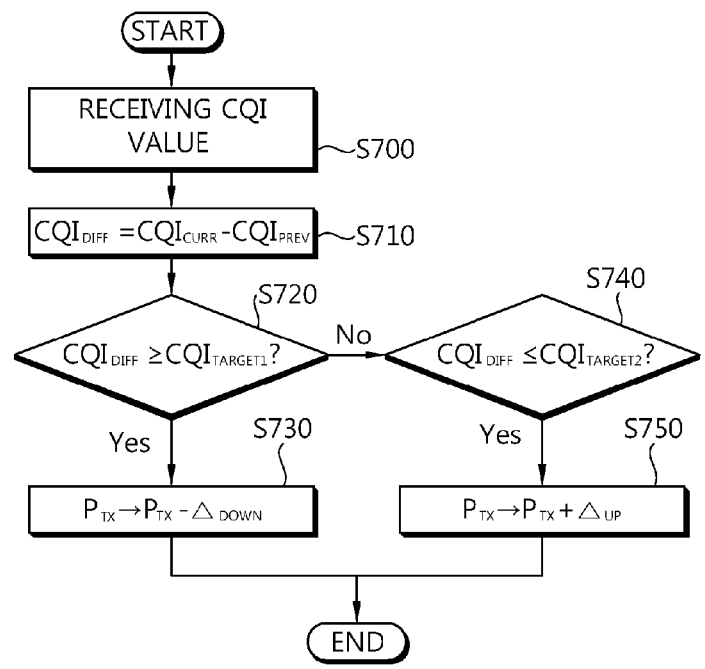
FIG. 17 is a flowchart showing a method of controlling power in accordance with a further embodiment of the present invention.

FIG. 17 is a flowchart showing a method of controlling power in accordance with a further embodiment of the present invention.

Referring to FIG. 17, the base station receives feedback information from the user equipment (S700). The feedback information represents CQI value.

The base station calculates a CQI change amount ($CQI_{DIFF}$) using the CQI value(S710). The CQI change amount ($CQI_{DIFF}$) represents a difference between a current CQI ($CQI_{CURR}$) and a previous CQI ($CQI_{PREV}$) ($CQI_{DIFF}=CQI_{CURR}-CQI_{PREV}$).

Next, the base station compares the CQI change amount ($CQI_{DIFF}$) with a first reference CQI change amount ($CQI_{TARGET1}$) (S720). The first reference CQI change amount ($CQI_{TARGET1}$) may be arbitrarily configured by the base station.

If the CQI change amount ($CQI_{DIFF}$) is equal to or greater than the first reference CQI change amount ($CQI_{TARGET1}$), the base station reduces the power (S730). Since the fact that the CQI change amount ($CQI_{DIFF}$) is equal to or greater than the first reference CQI change amount ($CQI_{TARGET1}$) means that the channel state is pretty good, it is possible to prevent waste of power.

If it is determined that the CQI change amount ($CQI_{DIFF}$) is smaller than the first reference CQI change amount ($CQI_{TARGET1}$) in S720, the base station compares the CQI change amount ($CQI_{DIFF}$) with a second reference CQI change amount ($CQI_{TARGET2}$) (S740). The second reference CQI change amount ($CQI_{TARGET2}$) may be arbitrarily configured by the base station.

If the CQI change amount ($CQI_{DIFF}$) is equal to or smaller than the second reference CQI change amount ($CQI_{TARGET2}$), the base station increases the power (S750). Since the fact that the CQI change amount ($CQI_{DIFF}$) is equal to or smaller than the second reference CQI change amount ($CQI_{TARGET2}$) means that the channel state is not good, it is necessary to increase the power.

If the CQI change amount ($CQI_{DIFF}$) is smaller than the first reference CQI change amount ($CQI_{TARGET1}$) and greater than the second reference CQI change amount ($CQI_{TARGET2}$), it is possible to maintain the current power as it is.

FIG. 17 illustrates the method of increasing or reducing the power by comparing the CQI change amount with the first and second CQI change amounts; however, the method is not limited thereto. For example, it is possible to compensate for the transmission power to a target power value ($P_{RECAL\_CQI}$) calculated using the CQI value received in S700. The method of calculating the target power value ($P_{RECAL\_CQI}$) is the same as described above.

In the case where the base station receives the CQI value that indicates the channel quality from the user equipment, the base station can control the power using only the CQI value, and thus it is possible to increase the use efficiency of radio resources.

[Power Control Using ACK/NACK Information, CQI Value, and Overload Indicator of Neighboring Cell]

The base station can control the power using an overload indicator received from a neighboring cell as well as the ACK/NACK information and the CQI value received from the user equipment.

For example, if an overload occurs in a specific cell, the base station transmits an overload indicator to a neighboring cell via an X2 interface. The cell that has received the overload indicator controls the power of the user equipment that receives the persistent scheduling, the user equipment that receives only broadcasting on a forward link or the user equipment that performs PDCCH link adaptation. Therefore, it is possible to reduce the overload of the cell in which the overload occurs.

The present invention may be implemented by hardware, software or a combination thereof. The hardware may be implemented by an application specific integrated circuit (ASIC) that is designed to perform the above-described functions, a digital signal processing (DSP), a programmable logic device (PLD), a field programmable gate array (FPGA), a processor, a controller, a microprocessor, other electronic units, or any combination thereof. The software may be implemented by a module for performing the above functions. The software may be stored in a memory unit and executed by a processor. The memory unit or the processor may employ a variety of means that are well known to those skilled in the art.

The foregoing description of the preferred embodiments of the present invention has been presented for the purpose of illustration and description. It is not intended to be exhaustive or to limit the invention to the precise form disclosed, and modifications and variations are possible in light of the above teachings or may be acquired from practice of the invention. It is intended that the scope of the invention be defined by the claims appended hereto and their equivalents.

The invention claimed is:

1. A method for controlling downlink transmission power in a wireless communication system, the method comprising:
   transmitting at least one data to a user equipment using the downlink transmission power;
   receiving feedback information for the data from the user equipment; and
   controlling the downlink transmission power using the feedback information,
   wherein the feedback information comprises ACK/NACK information for the at least one transmitted data and channel quality indicator (CQI) information, the CQI information comprising a $CQI_{BEST\,M}$ and a $CQI_{avg}$, and
   wherein the step of the controlling the downlink transmission power comprises:
   calculating an average CQI value,
   calculating a Signal to Interference and Noise Ratio (SINR) of the user equipment based on the average CQI value,
   calculating a target power value based on the SINR of the user equipment,
   setting the downlink transmission power to the target power value, and
   controlling the compensated downlink transmission power based on the feedback information,
   wherein the average CQI value is calculated based on a below equation:

$$\text{average CQI value} = \alpha CQI_{BEST\,M} + \beta CQI_{avg}$$

where the $CQI_{BEST\,M}$ is a CQI value of M subbands with highest CQI values among a total set of subbands, the $CQI_{avg}$ is a CQI value for residual subbands among the total set of subbands, and α and β are arbitrarily configured numbers.

2. The method of claim 1, wherein the step of controlling the compensated downlink transmission power comprises:
   reducing the compensated downlink transmission power if a CQI change amount, which is a difference between a current CQI and a previous CQI, is equal to or greater than a first reference CQI change amount and the ACK/NACK information comprises ACK, and
   increasing the compensated downlink transmission if the CQI change amount is equal to or smaller than a second reference CQI change amount and the ACK/NACK information comprises NACK.

3. The method of claim 1, wherein the downlink transmission power is compensated to the target power value if a CQI change amount, which is a difference between a current CQI and a previous CQI, is a positive value and the feedback information is ACK, or if the CQI change amount is a negative value and the feedback information is NACK, and wherein when the downlink transmission power is not compensated, a value of the compensated downlink transmission power to be controlled in the step of controlling is set to a value of the downlink transmission power.

4. The method of claim 1, wherein the step of controlling the compensated downlink transmission power comprises:

reducing the compensated downlink transmission power if a CQI change amount, which is a difference between a current CQI and a previous CQI, is equal to or greater than a first reference CQI change amount, and increasing the compensated downlink transmission power if the CQI change amount is equal to or smaller than a second reference CQI change amount.

5. The method of claim 1, wherein the downlink transmission power is controlled by further considering an overload indicator received from a neighboring cell.

6. The method of claim 1, wherein the target power value is set to a specific value so that a transmission error in a specific Modulation and Coding Scheme (MCS) is lower than a specific Block Error Rate (BLER).

7. The method of claim 1, wherein the step of controlling the compensated downlink transmission power comprises:

increasing the compensated downlink transmission power if a NACK generation rate is equal to or greater than a first reference NACK generation rate, and reducing the compensated downlink transmission power if the NACK generation rate is equal to or smaller than a second reference NACK generation rate.

8. A user equipment comprising:

a radio frequency (RF) unit for transmitting and receiving radio signals; and a processor, connected to the RF unit, and configured to:

transmit at least one data to a user equipment using downlink transmission power, receive feedback information for the data from the user equipment, and control the downlink transmission power using the feedback information, wherein the feedback information comprises ACK/NACK information for the at least one transmitted data and channel quality indicator (CQI) information, the CQI information comprising a $CQI_{BEST\,M}$ and a $CQI_{avg}$, and wherein the controlling the downlink transmission power comprises:

calculating an average CQI value, calculating a Signal to Interference and Noise Ratio (SINR) of the user equipment based on the average CQI value, calculating a target power value based on the SINR of the user equipment, setting the downlink transmission power to the target power value, and controlling the compensated downlink transmission power based on the feedback information, wherein the average CQI value is calculated based on a below equation:

$$\text{average CQI value} = \alpha CQI_{BEST\,M} + \beta CQI_{avg}$$

where the $CQI_{BEST\,M}$ is a CQI value of M subbands with highest CQI values among a total set of subbands, the $CQI_{avg}$ is the CQI value for residual subbands among the total set of subbands, and $\alpha$ and $\beta$ are arbitrarily configured numbers.

* * * * *